(12) United States Patent
Simske et al.

(10) Patent No.: US 8,760,263 B2
(45) Date of Patent: Jun. 24, 2014

(54) SYSTEM FOR RECOVERING DATA FROM AN UNREADABLE TAG

(75) Inventors: Steven J. Simske, Fort Collins, CO (US); Guillaume Oget, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 141 days.

(21) Appl. No.: 13/259,135

(22) PCT Filed: Mar. 31, 2009

(86) PCT No.: PCT/US2009/038970
§ 371 (c)(1),
(2), (4) Date: Sep. 22, 2011

(87) PCT Pub. No.: WO2010/114526
PCT Pub. Date: Oct. 7, 2010

(65) Prior Publication Data
US 2012/0013447 A1    Jan. 19, 2012

(51) Int. Cl.
*G06K 7/01* (2006.01)
(52) U.S. Cl.
USPC .......................................... 340/10.51; 714/25
(58) Field of Classification Search
USPC ................. 340/10.1, 10.2, 10.3, 10.4, 10.41, 340/10.42, 10.5, 10.51, 572.1; 714/25, 752, 714/758, 766
See application file for complete search history.

(56) References Cited

U.S. PATENT DOCUMENTS

| 5,574,851 | A  | * | 11/1996 | Rathunde ...................... 714/6.32 |
| 6,487,690 | B1 |   | 11/2002 | Schuster et al. |
| 7,405,660 | B2 |   | 7/2008  | Diorio et al. |
| 2003/0234718 | A1 |   | 12/2003 | Fujisawa et al. |
| 2008/0001719 | A1 |   | 1/2008  | Koo et al. |
| 2009/0091451 | A1 | * | 4/2009  | Jones et al. ................. 340/572.1 |
| 2010/0115335 | A1 | * | 5/2010  | Wylie et al. ..................... 714/25 |

FOREIGN PATENT DOCUMENTS

| CN | 101159025 | 4/2008 |
| EP | 1901201 A1 | 3/2008 |
| JP | 2008181477 | 8/2008 |
| KR | 100766972 | 10/2007 |
| WO | WO-2008086393 | 7/2008 |

OTHER PUBLICATIONS

International Search Report and Written Opinion for PCT/US2009/038970 dated Dec. 23, 2009 (11 pages).

* cited by examiner

*Primary Examiner* — Nabil Syed

(57) ABSTRACT

A system includes a population of items each including a tag, each tag including a plurality of identification bits and a plurality of redundancy bits, and a tag reader configured to read tags and determine the identification bits of at least one unreadable tag in the population based on the identification bits and the redundancy bits of at least one readable tag in the population.

15 Claims, 4 Drawing Sheets

SYSTEM FOR RECOVERING DATA FROM AN UNREADABLE TAG

BACKGROUND

Typical inventory, track and trace, inspection, authentication, and related applications utilize serialized data that identifies each item within a population of items. The serialized data is often written to a machine readable tag or marker attached to each item or integrated within each item in the population. The machine readable tag or marker may include a radio-frequency identification (RFID) chip, a bar code, a label, or other suitable device capable of indicating serialized data for each item in the population. Regarding RFID systems, while they continue to provide improved reading and reliability characteristics, there is no assurance that is made by design that all RFID chips in a population within the range of an RFID reader will be captured. Correspondingly, bar code systems can miss reading bar code labels if, for example, the labels are damaged, wet, stretched, or visually obstructed. This missing or unreadable serialized data for items within a population may create a barrier to implementing applications that rely on a 100% read rate of the serialized data for items within a population.

For these and other reasons, a need exists for the present invention.

DETAILED DESCRIPTION

In the following detailed description, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
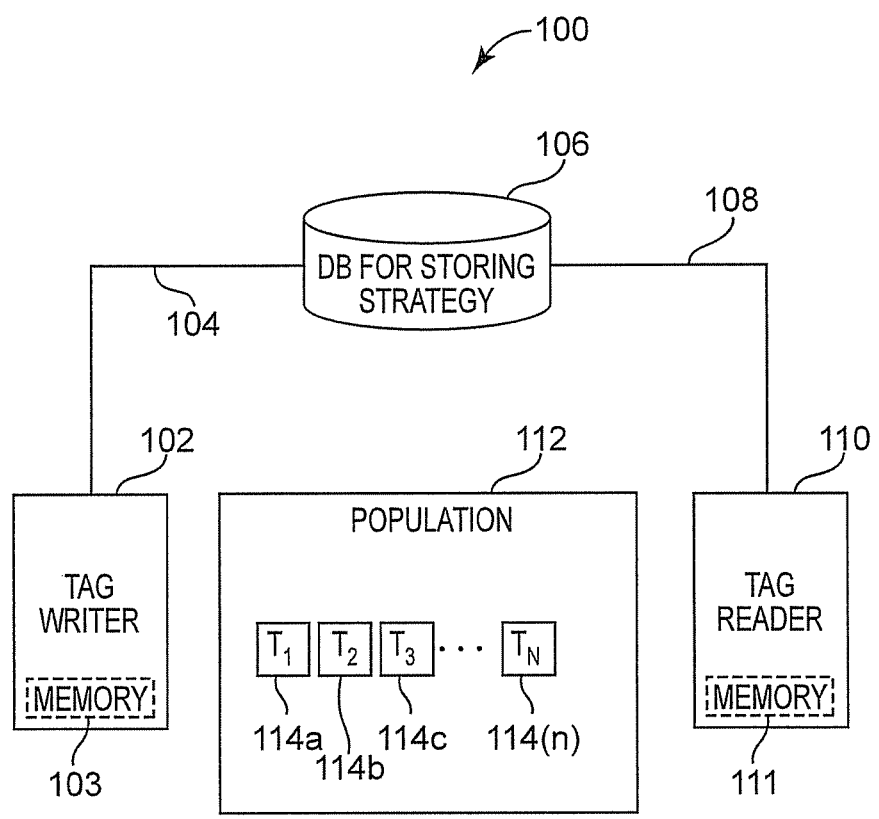
FIG. 1 is a diagram illustrating one embodiment of a system.

FIG. 1 is a diagram illustrating one embodiment of a system 100. System 100 includes a tag writer 102, a database 106, a tag reader 110, and a population 112. Population 112 includes a defined number of items 114a-114(n). In one embodiment, population 112 is a group of items that is shipped and/or stored together. Each item 114a-114(n) includes a tag $T_1$-$T_N$ that provides information for the item to which the tag pertains. In one embodiment, the information provided by each tag $T_1$-$T_N$ includes information unique to the item to which the tag pertains, such as serialized data.

As used herein, a "tag" is defined as a single carrier of a full bit length of data. The tag is typically printed, applied, or attached to an item (e.g., product or package) for identifying and/or tracing the item. In one embodiment, a tag includes a bar code printed, applied, or attached to an item. In another embodiment, a tag includes a radio-frequency identification (RFID) chip applied or attached to an item. In other embodiments, a tag includes another suitable device (e.g., a memory spot chip) printed, applied, or attached to an item for identifying and/or tracing the item.

Each tag $T_1$-$T_N$ includes at least identification bits for each item and population redundancy bits. In one embodiment, the identification bits provide data unique to the item to which the tag pertains. The population redundancy bits within each tag $T_1$-$T_N$ include exclusively-OR'd (XOR'd) identification bits of other items within the population. In one embodiment, system 100 enables recovery of the identification bits of unreadable tags from readable tags based on the XOR'd identification bits within the population redundancy bits of the readable tags. In one embodiment, the number of readable tags needed to read or recover 100% of the tags in the population is determined statistically and based on the desired confidence level.

Tag writer 102 is communicatively coupled to database 106 through communication link 104. Database 106 is communicatively coupled to tag reader 110 through communication link 108. Communication links 104 and 108 include wired or wireless communication links or combinations thereof. In another embodiment, database 106 is replaced by a first database communicatively coupled to tag writer 102 and a second database communicatively coupled to tag reader 110. In this embodiment, the second database includes a copy of the information stored in the first database. In another embodiment, database 106 is excluded, and the information stored within database 106 is embedded within a memory 103 of tag writer 102 and a memory 111 of tag reader 110.

Database 106 stores a strategy for writing the redundancy bits of tags $T_1$-$T_N$ of items 114a-114(n) within population 112. Database 106 stores the definitions of the XOR'd identification bits. As such, if tag reader 110 does not read all items 114a-114(n) within population 112, the identification bits of unread items can be recovered based on the read items and the definitions of the XOR'd identification bits stored in database 106.

Tag writer 102 writes the identification bits and population redundancy bits to tags $T_1$-$T_N$ of items 114a-114(n) within population 112. In one embodiment, tag writer 102 includes a printer for printing bar codes, an RFID writer for programming RFID chips, or another suitable device for writing identification bits and population redundancy bits to tags $T_1$-$T_N$. In one embodiment, tag writer 102 also includes a computer, microprocessor, controller, or other suitable logic device and a memory for defining the population redundancy bits to be written to each tag $T_1$-$T_N$ based on the identification bits for each tag and the definitions of the XOR'd identification bits stored in database 106 or embedded within tag writer 102.

Tag reader 110 reads the identification bits and population redundancy bits of tags $T_1$-$T_N$ of items 114a-114(n) within population 112. In one embodiment, tag reader 110 includes an optical scanner for reading bar codes, an RFID reader for reading RFID chips, or another suitable device for reading identification bits and redundancy bits of tags $T_1$-$T_N$. In one embodiment, tag reader 110 also includes a computer, microprocessor, controller, or other suitable logic device and a memory for interpreting the read tags. In one embodiment, tag reader 110 reads tags $T_1$-$T_N$ of items 114a-114(n) of population 112 and determines if any items include tags that are not a part of population 112. In another embodiment, tag reader 110 recovers unreadable tags based on readable tags and the definitions of the XOR'd identification bits stored in database 106 or embedded within tag reader 110. In one embodiment, tag reader 110 provides a 100% read rate when including recovered unreadable tags.

In operation, a population 112 of items 114a-114(n) is provided. In one embodiment, population 112 includes a group of items to be shipped together. The identification bits to be written to each tag $T_1$-$T_N$ for each item are defined. In one embodiment, suitable anti-collision policies are used to define serialized data for the identification bits. In addition, the definitions previously stored in database 106 for the population redundancy bits (i.e., which identification bits are XOR'd) for the population are read. The process for defining the population redundancy bits will be described below. In one embodiment, tag writer 102 determines the population redundancy bits for each tag $T_1$-$T_N$ based on the defined identification bits and the definitions for the population redundancy bits stored in database 106 or embedded in tag writer 102. Tag writer 102 then writes the defined identification bits and the population redundancy bits to the tag $T_1$-$T_N$ for each corresponding item 114a-114(n).

Population 112 is then shipped to its destination. At the destination, tag reader 110 reads each tag $T_1$-$T_N$ of items 114a-114(n). Tag reader 110 recognizes population 112 and determines whether any items within the population were not read. In addition, tag reader 110 determines whether any read item does not belong in population 112 based on the item's tag. In one embodiment, if tag reader 110 reads an item that does not belong in population 112, tag reader 110 outputs an alert indicating the item that does not belong in the population. If tag reader 110 determines that an item in population 112 was not read, tag reader 110 attempts to recover the identification bits of the unread item. In one embodiment, tag reader 110 recovers the identification bits based on the identification bits and the population redundancy bits of the read items and the definitions of the population redundancy bits previously stored in database 106 or embedded in tag reader 110. In one embodiment, if tag reader 110 cannot recover the identification bits of an unread item, tag reader 110 outputs an alert indicating the identification bits cannot be recovered. In another embodiment, if tag reader 110 cannot recover the identification bits of an unread item, tag reader 110 rereads each tag $T_1$-$T_N$ of items 114a-114(n) in population 112 in an attempt to read previously unread tags.

In one embodiment, a tag includes an RFID chip with 256 bits of data (i.e., full bit length equals 256 bits). The full bit length includes a payload portion (e.g., 96 bits). The payload portion is a unique set of bits associated with a particular item. The remaining bits of the full bit length are assigned to identification bits and population redundancy bits. For example, in one embodiment, the identification bits include 16 bits and the population redundancy bits include 144 bits. The identification bits are used to identify a particular item in a population of items. The population redundancy bits are used to reconstruct missing identification bits when the entire population is interrogated but a percentage of the population is not successfully read.

The following embodiment is provided as an example to demonstrate the mathematical concepts involved in defining the redundancy bits of tags $T_1$-$T_N$. In this embodiment, population 112 includes three items, each including four identification bits and four population redundancy bits. Any one of the three items may be unreadable by tag reader 110. For this embodiment, the identification bits are labeled "A," "B," and "C," and the population redundancy bits are labeled "D," "E," and "F." The items are defined as follows:

Item 1: A|D
Item 2: B|E
Item 3: C|F where | is the boundary between the identification bits and the population redundancy bits.

Example data for "A," "B," and "C" is defined as follows:
Item 1: 1011|D
Item 2: 1100|E
Item 3: 0110|F Example assignments or definitions for "D," "E," and "F" include:
D=B ⊕ C
E=A ⊕ C
F=A ⊕ B where ⊕ Is the (bitwise) XOR Boolean operator. Note that 1 ⊕ 0=0 ⊕ 1=1, and 0 ⊕ 0=1 ⊕ 1=0.

Therefore, using the example data above:
D=1100 ⊕ 0110=1010
E=1011 ⊕ 0110=1101
F=1011 ⊕ 1100=0111

The identification bits and population redundancy bits for each item are therefore as follows:
Item 1: 1011|1010
Item 2: 1100|1101
Item 3: 0110|0111

If one of the items is unreadable, then the unreadable item is recovered without knowing the identification bits or redundancy bits of the unreadable item. For example, if Item 2 is unreadable, then Item 2 is recovered without knowing B or E as follows:
Item 2=B|E=D ⊕ C|A ⊕ C since B=(B ⊕ C) ⊕ C=D ⊕ C
Therefore:
Item 2=1010 ⊕ 0110|1011 ⊕ 0110=1100|1101

In another embodiment, a chained bitwise XOR is used. In this embodiment, population 112 includes eight items, each including two identification bits and three population redundancy bits. Further, this example is robust to the loss of up to three of the eight items. In this example, the identification bits are labeled with lowercase letters "a" through "p" and the population redundancy bits are labeled "$P_1$" through "$P_{24}$" as follows:

Item 1: ab|$P_1 P_2 P_3$
Item 2: cd|$P_4 P_5 P_6$
Item 3: ef|$P_7 P_8 P_9$
Item 4: gh|$P_{10} P_{11} P_{12}$
Item 5: ij|$P_{13} P_{14} P_{15}$
Item 6: kl|$P_{16} P_{17} P_{18}$
Item 7: mn|$P_{19} P_{20} P_{21}$
Item 8: op|$P_{22} P_{23} P_{24}$ Robustness to the loss of at least three tags is provided by chained bitwise XOR's by assigning each $P_1$-$P_{24}$ as follows:

$P_1$=e ⊕ c
$P_2$=g ⊕ i
$P_3$=k ⊕ l
$P_4$=e ⊕ a
$P_5$=i ⊕ k
$P_6$=m ⊕ o
$P_7$=a ⊕ c
$P_8$;=g ⊕ k
$P_9$=i ⊕ m
$P_{10}$=n ⊕ p
$P_{11}$=c ⊕ m
$P_{12}$=e ⊕ o
$P_{13}$=b ⊕ d
$P_{14}$=f ⊕ l
$P_{15}$=n ⊕ p
$P_{16}$=b ⊕ f
$P_{17}$=d ⊕ h
$P_{18}$=j ⊕ n
$P_{19}$=j ⊕ b $P_{20} = l \oplus d$
$P_{21} = p \oplus h$
$P_{22} = j \oplus f$
$P_{23} = l \oplus h$
$P_{24} = a \oplus g$ $P_1$-$P_{24}$ are logically grouped in triads, or sets of three. In addition, each identification bit is represented in three unique such triads of population redundancy bits. For example, $P_{16}P_{17}P_{18}$ is one such triad, which provides the population redundancy bits of Item 6. Further, no identification bit is replicated in the population redundancy bits of the item to which it belongs. These anti-collision policies, while not necessary in the present example, are in general enforced on the set of items or item population to improve the (full or percent) recoverability of the identification bits. In other embodiments, other anti-collision policies are used.

At least three of the eight items in the population are recoverable. For example, if Items 3, 5, and 8 in the item population are unreadable, the information bits e, f, i, j, o, and p have been lost. These information bits can be recovered readily, however, from knowing at least the following:

$e = P_1 \oplus c$
$f = P_{16} \oplus b$
$i = P_2 \oplus g$
$j = P_{18} \oplus n$
$o = P_6 \oplus m$
$p_{21} \oplus h$ The missing information bits are recovered based on identification of the items that are not missing and the knowledge of how the XOR's are computed. For example, from knowing $P_{16} = b \oplus f$, the missing f can be recovered by knowing $P_{16}$ and b from the items that are not missing. In one embodiment, the knowledge of how the XOR's are computed is known without using a database storing the strategy for writing the redundancy bits. For example in one embodiment, $N_I$ is the number of items and $N_{IB}$ is the number of information bits. If $i = 0 \ldots N_{IB}-1$ and $j = 0 \ldots N_I-1$, then all the information bits can be arranged in a matrix with elements [i,j] in order as {0,0}, {0,1}, ..., {0,$N_1$-1}, {1,0}, {1,1}, ..., {1, $N_1$-1}, ..., {$N_{IB}$-1,0}, {$N_{IB}$-1,1}, ..., {$N_{IB}$-1,$N_I$-1}. Then, once the length, N, of the XOR chains is selected, the first N so ordered information bits can be XOR'ed together for the first redundancy bit, the next N so ordered information bits can be XOR'ed together for the second redundancy bit, etc. In one embodiment, N, $N_{IB}$, and $N_I$ have no common factors.

The concepts described with the previous two examples can be expanded to a general embodiment, where population 112 includes any suitable number $N_I$ of items. Each item includes a suitable number $N_{IB}$ of information bits, a suitable number $N_{PRB}$ of population redundancy bits, a suitable number $N_{APIB}$ of assigned population identifier bits, and a suitable number $N_{WAPIB}$ of within assigned population identifier bits. In one embodiment, for an example RFID configuration, the values are defined as follows:

$N_I = 1024$
$N_{IB} = 96$
$N_{PRB} = 144$
$N_{APIB} = 6$
$N_{WAPIB} = 10$ since $2^{10} = N_I$ The items are identified using the $N_{WAPIB}$ bits in sequence as binary 0000000000, 0000000001, ..., 1111111111 (i.e., decimal 0, 1, ..., 1023). The $N_{APIB}$ bits are used to identify to which group of up to 32 groups of 1024 items the particular item belongs. Thus, in this example, the population can include up to 32 multiplied by 1024 or 32,768 items. The 96 bits for each item, $N_{IB}$ can be fully random or for example use EPCglobal/GS1 format, in which case 38 bits are typically unique.

The 144 bits of $N_{PRB}$ provide 144 different combinations of chained XOR operations on the $N_{IB}$ bits of multiple items. The optimum chaining set (i.e., the chaining set that results in the lowest error rate) is determined using computer simulations, which will be described below. To determine the optimum chaining set, linear block coding theory for error code checking is used. Linear block coding theory provides a block code defined by (n, k, $d_{min}$), where n is the length of the information plus redundancy symbols, k (where k<n) is the length of the information symbols, and $d_{min}$ is the minimum Hamming distance between any two codes in the set. As a start, the generation of the 144 chained XOR expressions having as large of a $d_{min}$ as possible is considered. For example, if the XOR chains are 32 bits in length, then, since $144 < 2^8$, we presume a $d_{min}$ of 32-16-8=8 can be maintained.

Generally, system 100 provides the following four components. First, system 100 includes means, such as tag writer 102 and/or database 106, of assigning the initial 96 unique bits for the tags. If all 96 bits are randomly assigned, and each tag includes 256 bits for example, Hamming distances in the range of 26-31 are typically obtained. With 38 bits (as in Serialized Global Trade Item Number (SGTIN)) assigned randomly and the remaining 58 bits static (i.e. the same in each tag), Hamming distances of 10-13 are typically obtained.

Second, system 100 includes means, such as tag writer 102 and/or database 106, of assigning a chained XOR expression to each of the residual bits in the 256 bit tag. These XOR chains represent N other bits from other items in the population. The number, N, of tags simultaneously represented by these XOR chains is a variable that is optimized for the given deployment.

Third, the probability that all of the tags can be recovered for a given percentage of lost tags (L %) is computed for every combination of XOR chains. The max L % for 100% recovery is reported for every combination. The combination with the highest max L % is the optimal deployment used in system 100.

Fourth, system 100 is programmable (i.e., change each N value, generate probability curves, and recommend deployment). In one embodiment, only the variable bits, and not the static bits, are represented in the population redundancy bits, further improving the capability of the system to fully recover lost tags. For example, for SGTIN, an EPCglobal 96-bit standard (electronic product code), 38 bits are variable within a grouped population. In this example the 96 bits include the header, the filter, the partition, the company prefix, the item reference, and the serial number.

The header, which is 8 bits, is not variable within a grouped population. The filter, which is 3 bits and specifies if the tagged object is an item, case or pallet, is not variable within a grouped population. The partition, which is 3 bits and indicates how the subsequent fields are partitioned so that their data can be recovered and interpreted correctly, is not variable within a grouped population. The company prefix, which is 20-40 bits (depending on the partition bits) and contains the company's EAN.UCC Company Prefix, is not variable within a grouped population. The item reference, which is 4-24 bits (depending on the partition bits) and contains the item's GTIN item reference number, is not variable within a grouped population. Finally, the serial number, which is 38 bits and contains the item's unique serial number, is variable within a grouped population.

In this example, the value $N_{IB}$=38, such that if $N_{PRB}$=144, $N_{APIB}$=6 and $N_{WAPIB}$=10, there are nearly four population redundancy bits for every information bit. If these bits are truly randomly distributed for every conceivable set of unreadable items, then a fully randomized L % can be defined where:

144*(100−L)=38*L, or 14400=182L, or L=79.1%.

In general, then, the fully randomized, L can be defined by:

$N_{PRB}$*(100−L)=$N_{IB}$*L or:

L*($N_{IB}$+$N_{PRB}$)=100*$N_{PRB}$ or:

L %=100%*$N_{PRB}$/($N_{IB}$+$N_{PRB}$)

This value of L % is attempted to be achieved. Note, however, that no closed form solution for achieving such an L % exists (and, for boundary constraint reasons, it is difficult to achieve the L % in the above equation).

Figure 2:
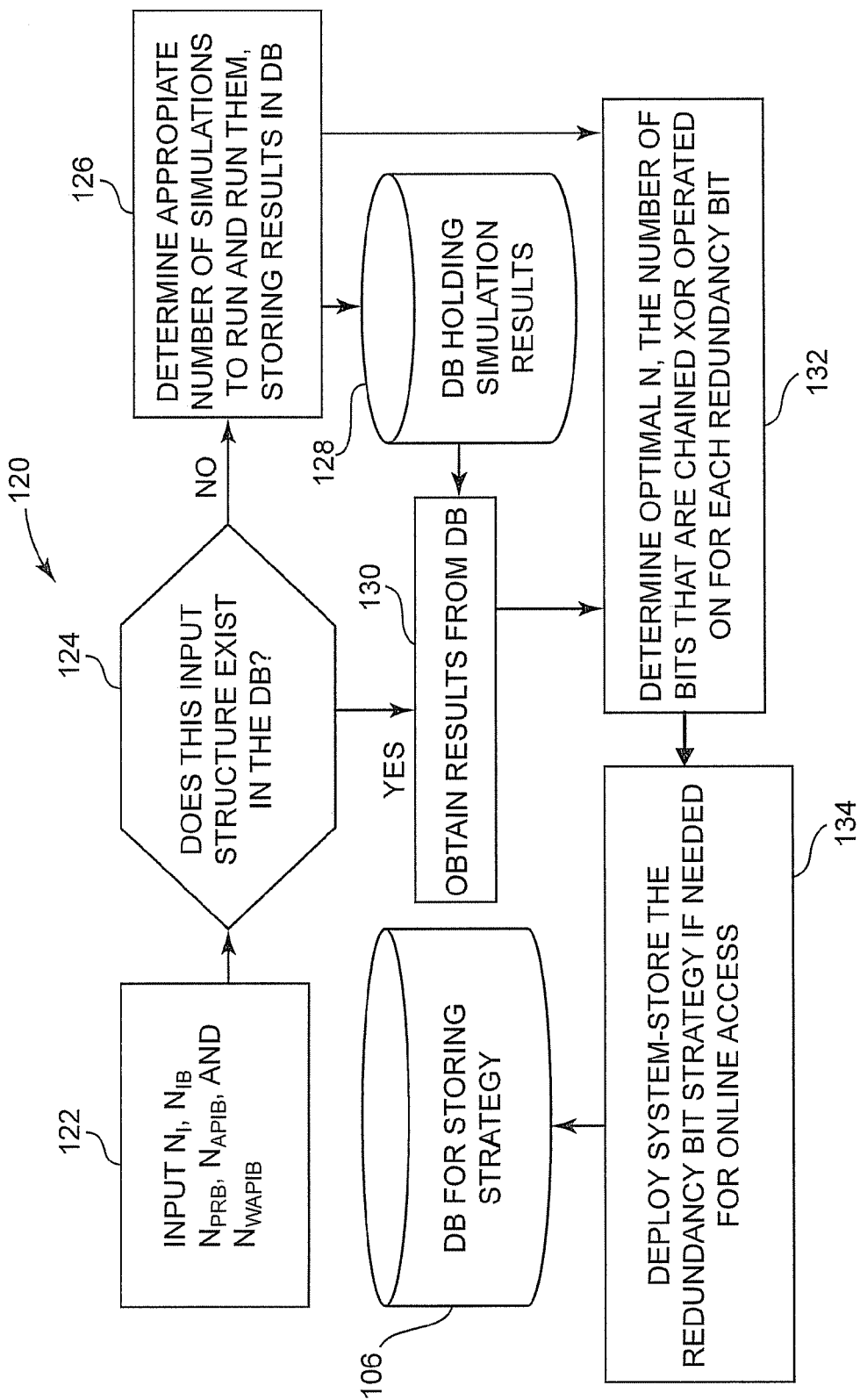
FIG. 2 is a flow diagram illustrating one embodiment for determining the deployment of the system.
Figure 3:
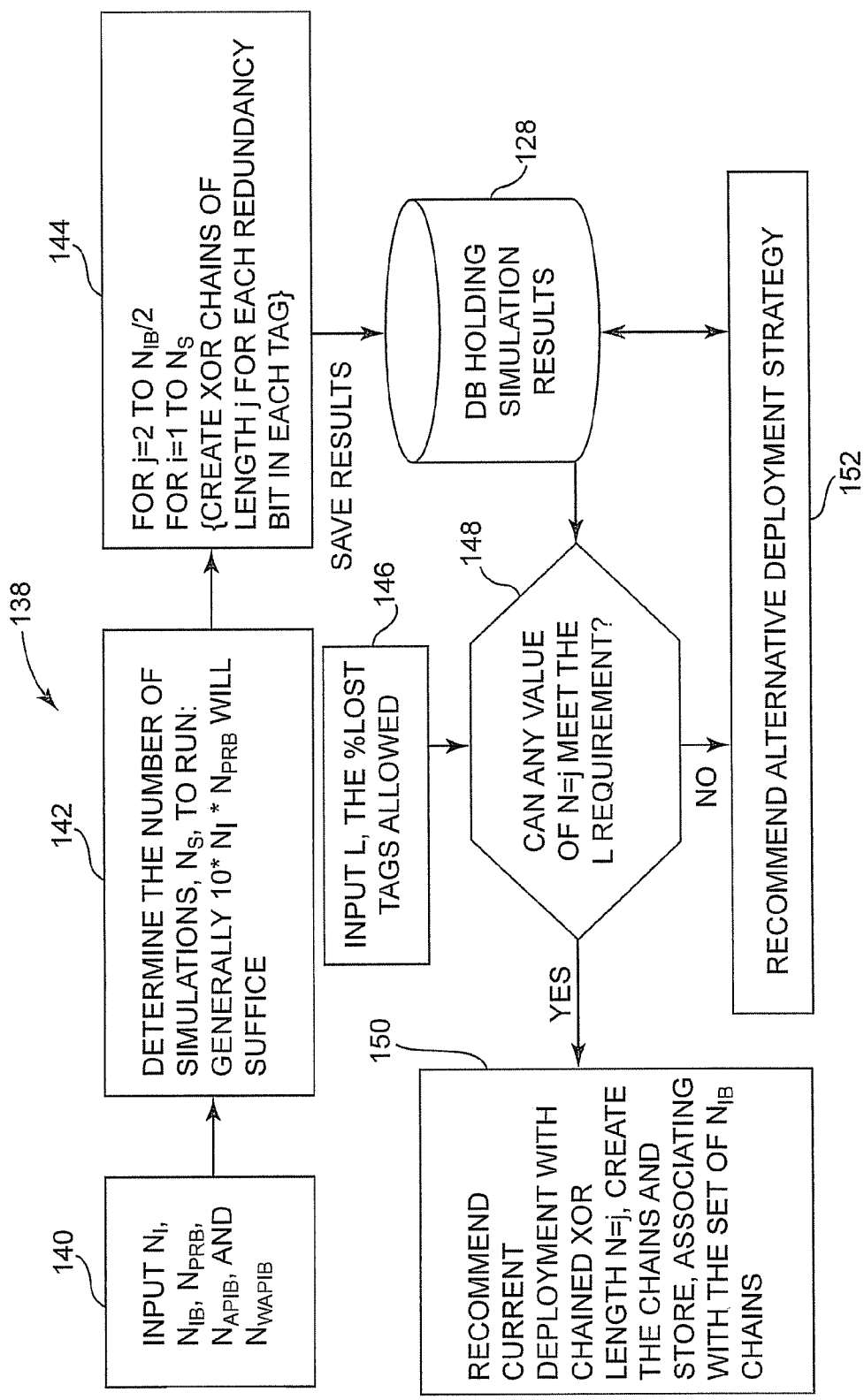
FIG. 3 is a flow diagram illustrating one embodiment for performing simulations for determining the deployment of the system.
Figure 4:
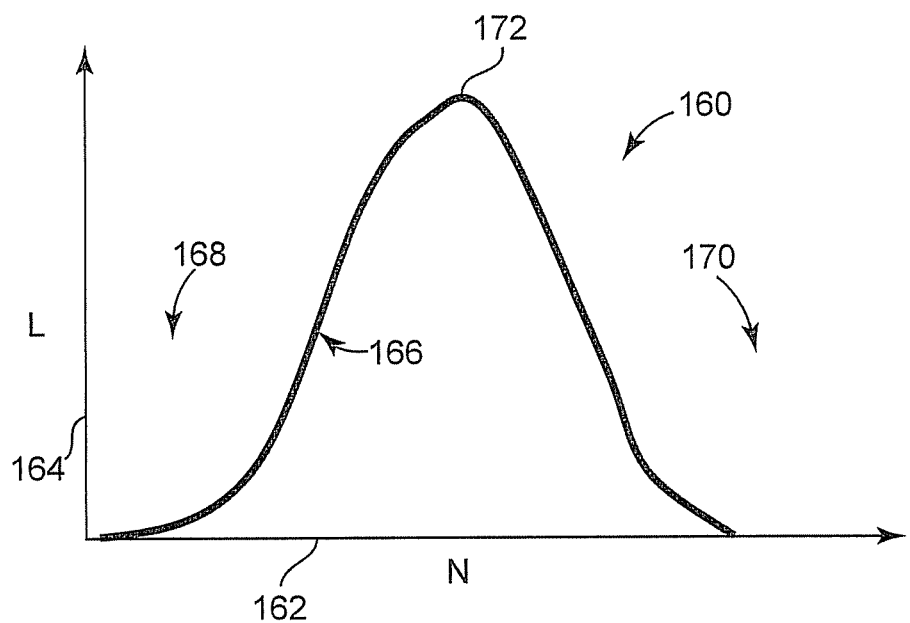
FIG. 4 is a chart illustrating one embodiment of the percentage of lost tags allowed (L) versus the length of each XOR chain (N) for determining the deployment of the system.

The following FIGS. 2-4 illustrate one embodiment of a method for determining a strategy for achieving the desired L for a predefined population and tag structure through simulations.

FIG. 2 is a flow diagram 120 illustrating one embodiment for determining the deployment of system 100. At 122, desired values for $N_I$, $N_{IB}$, $N_{PRB}$, $N_{APIB}$, and $N_{WAPIB}$ are input into a computer system. At 124, it is determined whether the input structure already exists in the database. If the input structure does not already exist in the database, then at 126 the appropriate number of simulations to run is determined and the simulations are run. The results of the simulations are stored in the database at 128. If the input structure does already exist in the database or after the simulation results are stored in the database at 128, then at 130, the simulation results are obtained from the database. At 132, the optimal N (i.e., the number of bits that are chained XOR operated on for each redundancy bit) is determined based on the simulation results. At 134, the system is deployed by storing the redundancy bit strategy to the database at 106. In one embodiment, the redundancy bit strategy is stored for online access.

FIG. 3 is a flow diagram 138 illustrating one embodiment for performing simulations for determining the deployment of system 100. At 140, desired values for $N_I$, $N_{IB}$, $N_{PRB}$, $N_{APIB}$, and $N_{WAPIs}$ are input into a computer system. At 142, the number of simulations ($N_S$) to run is determined. In one embodiment, 10*$N_I$*$N_{PRB}$ is a sufficient number of simulations. At 144, XOR chains of length j for each redundancy bit in each tag are created using a nested loop as follows:

For j=2 to $N_{IB}$/2
For i=1 to $N_S$
{create XOR chains of length j for each redundancy bit in each tag}

The simulation results are saved to the database at 128. At 146, a desired value for L (i.e., the percent of lost tags allowed) is input. At 148, it is determined whether any value of N=j meets the L requirement. If a value of N=j cannot meet the L requirement, then at 152 an alternative deployment strategy is recommended. If a value of N=j can meet the L requirement, then at 150 the current deployment with chained XOR length N=j is recommended. The XOR chains are created and associated with the set of $N_{IB}$ chains and stored in a database.

FIG. 4 is a chart 160 illustrating one embodiment of L versus N for determining the deployment of system 100. Chart 160 includes N on x-axis 162 and L on y-axis 164. Curve 166 illustrates the optimum N at 172. Below the optimum N as indicated at 168, the amount of total redundancy of potentially lost bits is decreased, increasing the likelihood individual tag losses will remove the reference or references to lost bits. Above the optimum N as indicated at 170, the number of other tags used in the XOR chains increases, increasing the likelihood individual tag losses will impact any given redundancy bit.

Embodiments provide a system where tags can be successfully interrogated or recovered, even when a sometimes large percentage of the tags are not readable. In one embodiment, inference (i.e., linking of a larger set of tags to a larger tag, and so on recursively) can be used to allow many tags to be grouped together, with recovery statistics manageable at a lot level. In one embodiment, probability of recovery curves can be generated for each choice of grouping (i.e., $N_I$, $N_{IB}$, $N_{PRB}$, $N_{APIB}$, $N_{WAPIB}$) and XOR strategy. This allows the deployment of the system to be crafted to provide a trade off between the desired number of variable bits in the tags and the recovery capability. For example, reducing the number of variable bits in the tags increases the probability of full recovery of the unsuccessfully read tags from the chained XOR bits of the successfully read tags.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system, comprising:
a population of items each including a tag, each tag being a single carrier of a full bit length of data and each tag including:
a plurality of identification bits to identify a corresponding one of the items of the population; and
a plurality of redundancy bits, the redundancy bits including exclusively-OR'd (XOR'd) identification bits of at least two other items within the population, wherein no identification bit of the corresponding one of the items is replicated in the plurality of redundancy bits of the corresponding one of the items; and
a tag reader configured to read tags and determine the identification bits of at least one unreadable tag in the population based on the identification bits and the redundancy bits of at least one readable tag in the population.

2. The system of claim 1, wherein the tag reader is configured to determine whether an item belongs to the population and to determine which tags in the population were unreadable.

3. The system of claim 1, wherein each tag comprises one of a radio-frequency identification (RFID) chip and a bar code label.

4. The system of claim 1, further comprising:
a tag writer configured to write the plurality of identification bits and the plurality of redundancy bits to each tag in the population;
wherein the tag writer is configured to write to each redundancy bit of each tag in the population a respective XOR chain of identification bits from other items in the population; and wherein the tag reader is configured to determine the identification bits of the at least one unreadable tag from the XOR chain in each redundancy bit of at least one readable tag in the population.

5. The system of claim 4, wherein a definition of each XOR chain of identification bits is stored in a database or embedded within the tag writer and the tag reader.

6. The system of claim 4, wherein a length of each XOR chain is set to provide a selected probability of 100 percent recovery of identification bits of unreadable tags in the population for a given percentage of unreadable tags.

7. A system, comprising:
means for reading a population of tags, each tag associated to an item, each tag being a single carrier of a full bit length of data, and each tag including:
a plurality of identification bits to identify the item corresponding with the tag; and
a plurality of population redundancy bits, the population redundancy bits including exclusively-OR'd (XOR'd) identification bits of at least two other tags within the population, wherein no identification bit of the tag is replicated in the plurality of redundancy bits of the tag; and
means for recovering identification bits of an unreadable tag in the population based on the identification bits and the population redundancy bits of at least one readable tag in the population.

8. The system of claim 7, further comprising:
means for writing the population of tags, including writing an XOR chain of identification bits of the at least two other tags in the population to each population redundancy bit of each tag in the population.

9. The system of claim 8, further comprising:
means for determining an optimal length of each XOR chain to provide a selected probability of 100 percent recovery of identification bits of unreadable tags in the population for a given percentage of unreadable tags.

10. A method for recovering data from an unreadable tag in a population of items each including a tag, the method comprising:
reading a population of tags, each tag being a single carrier of a full bit length of data and each tag including:
a plurality of identification bits to identify the item corresponding with the tag; and
a plurality of population redundancy bits, the population redundancy bits including exclusively-OR'd (XOR'd) identification bits of at least two other tags within the population of tags, wherein no identification bit of the tag is replicated in the plurality of redundancy bits of the tag;
determining which tags within the population were unreadable; and
determining the identification bits of unreadable tags within the population based on the identification bits and the population redundancy bits of at least one readable tag in the population.

11. The method of claim 10, further comprising:
writing the population of tags, including writing a respective XOR chain of identification bits of other tags in the population to each population redundancy bit of each tag in the population.

12. The method of claim 11, further comprising:
storing definitions of each XOR chain in a database.

13. The method of claim 11, further comprising:
determining a length of each XOR chain by running simulations to determine the optimal length of each XOR chain to maximize recovery of the identification bits of unreadable tags in the population.

14. The method of claim 13, further comprising:
determining a number of simulations to run based on a number of items in the population and a number of population redundancy bits for each tag.

15. The method of claim 13, wherein determining the length of each XOR chain comprises determining the length of each XOR chain to maximize recovery of the identification bits for a defined percentage of unreadable tags in the population.

* * * * *